US010932253B2

(12) United States Patent
Centonza et al.

(10) Patent No.: US 10,932,253 B2
(45) Date of Patent: Feb. 23, 2021

(54) RADIO NETWORK NODES MANAGEMENT SYSTEM PROVIDING DUAL CONNECTIVITY

(71) Applicant: Telefonaktiebolaget LM Ericsson (publ), Stockholm (SE)

(72) Inventors: Angelo Centonza, Stockholm (SE); Elena Myhre, Järfälla (SE); Alexander Vesely, Feldbach (AT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/060,733

(22) PCT Filed: Jan. 8, 2016

(86) PCT No.: PCT/EP2016/050303
§ 371 (c)(1),
(2) Date: Jun. 8, 2018

(87) PCT Pub. No.: WO2017/118489
PCT Pub. Date: Jul. 13, 2017

(65) Prior Publication Data
US 2018/0368140 A1 Dec. 20, 2018

(51) Int. Cl.
*H04W 4/00* (2018.01)
*H04W 72/04* (2009.01)
(52) U.S. Cl.
CPC .............................. *H04W 72/0426* (2013.01)
(58) Field of Classification Search
CPC . H04W 72/0426; H04W 36/30; H04W 36/08; H04W 28/10; H04W 24/10
See application file for complete search history.

(56) References Cited

U.S. PATENT DOCUMENTS

2012/0276906 A1* 11/2012 Elmdahl ......... H04W 36/00835
455/437
2014/0086177 A1* 3/2014 Adjakple ............... H04W 12/08
370/329

(Continued)

OTHER PUBLICATIONS

3rd Generation Partnership Project, 3rd Generation Partnership Project; Technical Specification Group Services and System Aspects; General Packet Radio Service (GPRS) enhancements for Evolved Universal Terrestrial Radio Access Network (E-UTRAN) access (Release 13), 3GPP TS 23.401 V 13.4.0, Sep. 1, 2015, pp. 1-334, 3GPP, France.

(Continued)

*Primary Examiner* — Abdelnabi O Musa
(74) *Attorney, Agent, or Firm* — Patent Portfolio Builders, PLLC

(57) ABSTRACT

Embodiments herein relate to a method performed by a second radio network node (15) for enabling communication for a wireless device (10) in a communication network (1). The communication network (1) comprises a first network and a second network, which second radio network node (15) is associated with the second network and a first radio network node (12) is associated with the first network and the first radio network node (12) and the second radio network node (15) are serving or are to serve the wireless device (10) jointly. The first network comprises partitioned sets of functionalities where in a first set of functionalities belongs to a first network slice supporting the wireless device (10), and which first set of functionalities is separated from another set of functionalities out of a total set of functionalities in the first network. The second radio network node receives an indication from the first radio network node (12), which indication indicates identity of the first network slice supporting the wireless device (10). The (Continued)

second radio network node handles data to and/or from the wireless device (10) using the received indication.

20 Claims, 11 Drawing Sheets

(56) References Cited

U.S. PATENT DOCUMENTS

| | | | |
|---|---|---|---|
| 2016/0057687 A1* | 2/2016 | Horn | H04W 24/10 370/331 |
| 2017/0054595 A1* | 2/2017 | Zhang | H04L 41/5048 |
| 2019/0007899 A1* | 1/2019 | Vrzic | H04W 16/10 |

OTHER PUBLICATIONS

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", Technical Specification, 3GPP TS 36.300 V13.1.0, Sep. 1, 2015, pp. 1-254, 3GPP, France.

Ericsson, "Network Slicing isolation", Agenda Item 3.4, 3GPP TSG-SA WG1 Meeting #71bis ad-hoc, Vancouver, Canada, Oct. 19, 2015, pp. 1-3, S1-153136, 3GPP.

3rd Generation Partnership Project, "3rd Generation Partnership Project; Technical Specification Group Services and System Aspects; Feasibility Study on New Services and Markets Technology Enablers; Stage 1 (Release 14)", 3GPP TR 22.891 V1.0.0, Sep. 1, 2015, pp. 1-74, 3GPP, France.

LG Electronics, "5G device aspects", Agenda item:7.4, 3GPP SA WG 2 Meeting#111, Chengdu, China, Oct. 13, 2015, pp. 1-10, S2-153165, 3GPP.

3rd Generation Partnership Project, "Network Functions Virtualisation (NVF); Use Cases", 3GPP draft, ETSI GS NFV 001 V1.1.1, Oct. 1, 2013, pp. 1-50, ETSI.

Office Action issued in application No. 16700200.5; dated Apr. 9, 2019; 07 pages.

* cited by examiner

RADIO NETWORK NODES MANAGEMENT SYSTEM PROVIDING DUAL CONNECTIVITY

TECHNICAL FIELD

Embodiments herein relate to a first radio network node, a second radio network node and methods performed therein for communication. Furthermore, a computer program and a computer readable storage medium are also provided herein. In particular, embodiments herein relate to enabling communication for a wireless device in a communication network.

BACKGROUND

In a typical communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cell areas, with each service area or cell area being served by a radio network node such as a radio access node e.g., a Wi-Fi access point or a radio base station (RBS), which in some networks may also be denoted, for example, a "NodeB" or "eNodeB". A service area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs are typically connected to one or more core networks.

Specifications for the Evolved Packet System (EPS), also called a Fourth Generation (4G) network, have been completed within the 3$^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface. EPS is the Evolved 3GPP Packet Switched Domain. FIG. 1 is an overview of the EPC architecture. This architecture is defined in 3GPP TS 23.401 v.13.4.0 wherein a definition of a Packet Data Network Gateway (PGW), a Serving Gateway (SGW), a Policy and Charging Rules Function (PCRF), a Mobility Management Entity (MME) and a wireless or mobile device (UE) is found. The LTE radio access, E-UTRAN, comprises one or more eNBs. FIG. 2 shows the overall E-UTRAN architecture and is further defined in for example 3GPP TS 36.300 v.13.1.0. The E-UTRAN comprises eNBs, providing a user plane comprising the protocol layers Packet Data Convergence Protocol (PDCP)/Radio Link Control (RLC)/Medium Access Control (MAC)/Physical layer (PHY), and a control plane comprising Radio Resource Control (RRC) protocol in addition to the user plane protocols towards the wireless device. The radio network nodes are interconnected with each other by means of the X2 interface. The radio network nodes are also connected by means of the S1 interface to the EPC, more specifically to the MME by means of an S1-MME interface and to the S-GW by means of an S1-U interface.

The S1-MME interface is used for control plane between eNodeB/E-UTRAN and MME. The main protocols used in this interface are S1 Application Protocol (S1-AP) and Stream Control Transmission Protocol (SCTP). S1AP is the application Layer Protocol between the radio network node and the MME and SCTP for example guarantees delivery of signaling messages between MME and the radio network node. The transport network layer is based on Internet Protocol (IP).

A subset of the S1 interface provided functions are:
S1-interface management functions such as S1 setup, error indication, reset and the radio network node and MME configuration update.
UE Context Management functionality such as Initial Context Setup Function and UE Context Modification Function.
E-UTRAN Radio Access Bearer (E-RAB) Service Management function e.g. Setup, Modify, Release.
Mobility Functions for wireless devices in EPS Connection Management (ECM)-CONNECTED, e.g. Intra-LTE Handover and inter-3GPP-Radio Access Technology (RAT) Handover.
S1 Paging function.
Non Access Stratum (NAS) Signaling Transport function.

Establishment of the S1-MME interface on S1AP protocol level is shown in FIG. 3 as the S1 setup procedure. The purpose of the S1 Setup procedure is to exchange application level data needed for the radio network node and the MME to correctly interoperate on the S1 interface. The radio network node may initiate the procedure by sending an S1 SETUP REQUEST message to the MME once it has gained IP connectivity and it has been configured with at least one Tracking Area Indicator (TAI). The TAI(s) are used by the radio network node to locate IP-addresses of the different MMEs, possibly in different MME pools. The radio network node includes its global radio network node identity and other information in the S1 SETUP REQUEST message. The MME responds with an S1 SETUP RESPONSE message. This S1 SETUP RESPONSE message includes for example the Globally Unique MME identifier(s) (GUMMEI) of the MME.

An Initial Context Setup process is shown in FIG. 4. An INITIAL CONTEXT SETUP REQUEST message is sent by the MME to request the setup of a UE context or context of a wireless device. This INITIAL CONTEXT SETUP REQUEST message comprises information related to both the UE context and different E-RABs to be established. For each E-RAB the MME includes E-RAB Quality of Service (QoS) parameters such as QoS Class Identifier (QCI) and Allocation and Retention Priority (ARP). The QCI is a scalar that is used as a reference to radio access node-specific parameters that control bearer level packet forwarding treatment, e.g. scheduling weights, admission thresholds, queue management thresholds, link layer protocol configuration, etc., and that have been pre-configured by the operator owning the radio network node. Current assumption is that the RAN-CN split is similar for 5G as for 4G, implying an (evolved) S1 interface. An INITIAL CONTEXT SETUP RESPONSE message is sent by eNB to the MME confirming the setup.

The wireless communication industry is at the verge of a unique business crossroads. The growing gap between capacity and demand is an urgent call for new approaches and alternative network technologies to enable mobile operators to achieve more with less. Today, mobile broadband data is growing at an annual rate of 40-50 percent per year in the U.S. and other regions globally. Mobile service providers address these rapidly expanding traffic volumes through deployment of additional network functions, which will be a significant capital expenditure (CAPEX) challenge. The nature of that mobile broadband data traffic is also evolving with new services including new video applications, connected cars and the Internet of Things (IoT). This rapid capacity growth and increasing traffic diversity in LTE networks stresses the assumptions of existing network architectures and operational paradigms.

Network Functions Virtualization (NFV) provides a new path that can increase the flexibility required by mobile service providers and network operators to adapt and accommodate this dynamic market environment. NFV is a new operational approach applying well-known virtualization technologies to create a physical Commercial Off-the-Shelf (COTS) distributed platform for the delivery of end-to-end services in the context of the demanding environment of telecom network infrastructure and applications.

Because EPC is critical to the realization and management of all LTE traffic, it is important to consider use cases related to virtualization of the EPC elements. Each individual EPC element also has specific considerations that determine whether to deploy with NFV. Virtualized EPC (vEPC) is a good example: Multiple virtualized network functions (VNF) can be deployed and managed on a Network Functions Virtualization Infrastructure (NFVI) but must cater to performance scalability in both signaling/control plane and user plane, each potentially demanding different levels of NFVI resources.

vEPC elements can benefit from more agile deployment and scalability. However, virtual resource monitoring and orchestration, along with service awareness, are essential for implementing elasticity effectively. Due to the nature of telecom networks, service Level Agreements (SLA) will be a key issue for a virtualized mobile core network. Because virtualization usually leads to a performance trade-off, equipment vendors must optimize data-plane processing to satisfy carrier-grade bandwidth and latency requirements and sufficient control-plane performance for SLAs needed to ensure availability of regulatory services, such as emergency calls.

VNF is a virtualized network function which serves as a VNF Software for providing virtual network capabilities. A VNF could be decomposed and instantiated in roles such as Virtualized MME (vMME), Virtualized PCRF (vPCRF), Virtualized SGW (vSGW) or Virtualized PDN-GW (vPDN-GW).

NFV is seen as an enabler for network slicing that is described herein.

When looking at the wide range of applications and use cases that are addressed with a 5G network, it is quite obvious these cannot effectively be addressed with a traditional approach of having a purpose built network for each application. This will lead to high cost for networks and devices as well as inefficient use of valuable frequency resources. An operator may have one physical network infrastructure and one pool of frequency bands, which may support many separate virtualized networks, also called network slices. Each network slice may have unique characteristics for meeting the specific requirements of the use case/s it serves.

A key function of 5G Core network is to allow for flexibility in network service creation, making use of different network functions suitable for the offered service in a specific network slice, e.g. Evolved Mobile Broadband (MBB), Massive Machine Type Communication (MTC), Critical MTC, Enterprise, etc.

In addition to Service optimized networks there are more drivers for Network slicing, such as;

Business expansion by low initial investment: Given the physical infrastructure it is much easier to instantiate another Packet Core instance for the business expansion than to set up a new parallel infrastructure or even integrated nodes Low risk by no/limited impact on legacy: As the new instance is logically separated from the other network slices, the network slices can also provide resource isolation between each other. Thus introduction of a new isolated network slice will not impact the existing operator service and therefore only provide low risk Short Time To Market (TTM): The operators are concerned about the time it takes to set up the network for a new service. Slicing of the network for different services/operator use cases provides a separation of concern that can result in a faster setup of a network slice for a certain service as it is separately managed and with limited impact on other network slices Optimized use of resources: Today the network is supporting many different services but with new use cases and more diverging requirements there is a need for optimizing the network for the specific type use case. Network slicing allows to match services to optimized network instances, and it also allows for a more optimized use of those specific resources Allows for individual network statistics: With service specific network slices and possibly even on the level of individual enterprises, there is a possibility of collecting network statistics specific for a limited and well defined group of users of the network slice. This is not the key driver for slicing but rather a benefit that may be a useful tool Slicing can also be used to isolate different services in an operator's network. Future networks are expected to support new use cases going beyond the basic support for voice services and mobile broadband currently supported by existing cellular network, e.g. 2G/3G/4G. Some example use cases include:

Evolution of MBB
  Evolved communication services
  Cloud services
  Extended mobility and coverage
Mission critical Machine Type Communication
  Intelligent traffic systems
  Smart grid
  Industrial applications
Massive Machine Type Communication
  Sensors/actuators
  Capillary networks
Media
  Efficient on-demand media delivery
  Media awareness
  Efficient support for broadcast services These use cases are expected to have different performance requirements, e.g. bit-rates, latencies, as well as other network requirements, e.g. mobility, availability, security etc., affecting the network architecture and protocols.

Supporting these use cases could also mean that new players and business relations are needed compared to existing cellular networks. For instance it is expected that future networks should address the needs of Enterprise services
Government services, e.g. national safety
Verticals industries, e.g. automation, transportation
Residential users These different users and services are also expected to put new requirements on the network. FIG. 5 shows an example of a network slicing for a case when there exists different network slices in the core network for MBB, Massive MTC and Critical MTC.

Network slicing introduces the possibility that the network slices are used for different services and use cases and there is a need to enable usage of this mechanism for wireless devices in the communication network to improve the performance of the communication network.

SUMMARY

An object of embodiments herein is to provide a mechanism for improving performance of the communication network in an efficient manner.

According to an aspect the object is achieved by a method performed by a second radio network node for enabling communication for a wireless device in a communication network. The communication network comprises a first network and a second network, which second radio network node is associated with the second network and a first radio network node is associated with the first network. The first radio network node and the second radio network node are serving or are to serve the wireless device jointly. The first network comprises partitioned sets of functionalities wherein a first set of functionalities belongs to a first network slice supporting the wireless device, and which first set of functionalities is separated from another set of functionalities out of a total set of functionalities in the first network. The second radio network node receives an indication from the first radio network node, which indication indicates identity of the first network slice supporting the wireless device. The second radio network node then handles data to and/or from the wireless device using the received indication.

According to another aspect the object is achieved by a method performed by a first radio network node for enabling communication for a wireless device in a communication network. The communication network comprises a first network and a second network, which first radio network node is associated with the first network and a second radio network node is associated with the second network and the first radio network node and the second radio network node are serving or are to serve the wireless device jointly. The first network comprises partitioned sets of functionalities wherein a first set of functionalities belongs to a first network slice supporting the wireless device, and which first set of functionalities is separated from another set of functionalities out of a total set of functionalities in the first network. The first radio network node transmits an indication to the second radio network node, which indication indicates identity of the first network slice supporting the wireless device.

According to yet another aspect the object is achieved by providing a second radio network node for enabling communication for a wireless device in a communication network. The communication network comprises a first network and a second network, which second radio network node is configured for the second network and a first radio network node is configured for the first network and the first radio network node and the second radio network node are configured to serve the wireless device jointly. The first network comprises partitioned sets of functionalities wherein a first set of functionalities belongs to a first network slice supporting the wireless device, and which first set of functionalities is separated from another set of functionalities out of a total set of functionalities in the first network. The second radio network node is configured to receive an indication from the first radio network node, which indication indicates identity of the first network slice supporting the wireless device. The second radio network node is further configured to handle data to and/or from the wireless device using the received indication.

According to still another aspect the object is achieved by providing a first radio network node for enabling communication for a wireless device in a communication network. The communication network comprises a first network and a second network, which first radio network node is configured for the first network and a second radio network node is configured for the second network and the first radio network node and the second radio network node are configured to serve the wireless device jointly. The first network comprises partitioned sets of functionalities wherein a first set of functionalities belongs to a first network slice supporting the wireless device, and which first set of functionalities is separated from another set of functionalities out of a total set of functionalities in the first network. The first radio network node is configured to transmit an indication to the second radio network node, which indication indicates identity of the first network slice supporting the wireless device.

It is furthermore provided herein a computer program comprising instructions, which, when executed on at least one processor, cause the at least one processor to carry out any of the methods above, as performed by the first radio network node or the second radio network node. It is additionally provided herein a computer-readable storage medium, having stored thereon a computer program comprising instructions which, when executed on at least one processor, cause the at least one processor to carry out the method according to any of the methods above, as performed by the first radio network node or the second radio network node.

Embodiments herein introduce an efficient manner of enabling sliced network structuring and usage by providing the indication to the second radio network node. Embodiments described herein allow to enable specific resource management policies and network behaviours for cases where different radio network nodes are used to jointly serve the same wireless device and where network slicing is used. The embodiments contemplate the use of a piece of information that allows the identification of such resource management policy or in equivalent terms the identification of a network slice and its allocated share of resources within the network. The embodiments cover both the case of wireless devices served conjunctly by multiple radio network nodes of potentially different radio technologies as well as the case of wireless devices moving within a mobile network and needing the resource management policy to be delivered to a new serving RAN node. Therefore the embodiments allow for the adoption of the resource management policies assigned to the wireless device and its bearers to be enforced also after the wireless device moves across RAN nodes or RANs. Embodiments herein thus enable the communication for the wireless device across RAN nodes or RANs leading to an improved performance of the wireless communication network.

BRIEF DESCRIPTION OF THE DRAWINGS

Embodiments will now be described in more detail in relation to the enclosed drawings, in which.

DETAILED DESCRIPTION

Figure 1:
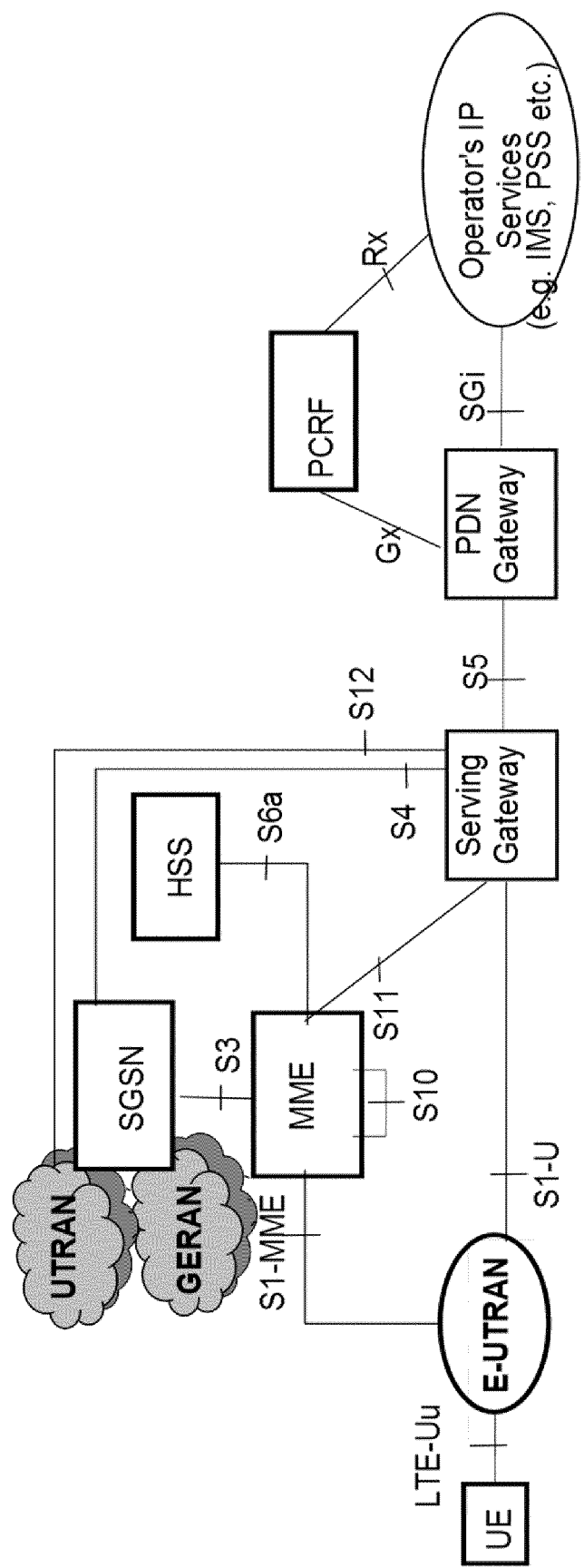
FIG. 1 is a schematic overview depicting a communication network according to prior art.
Figure 2:
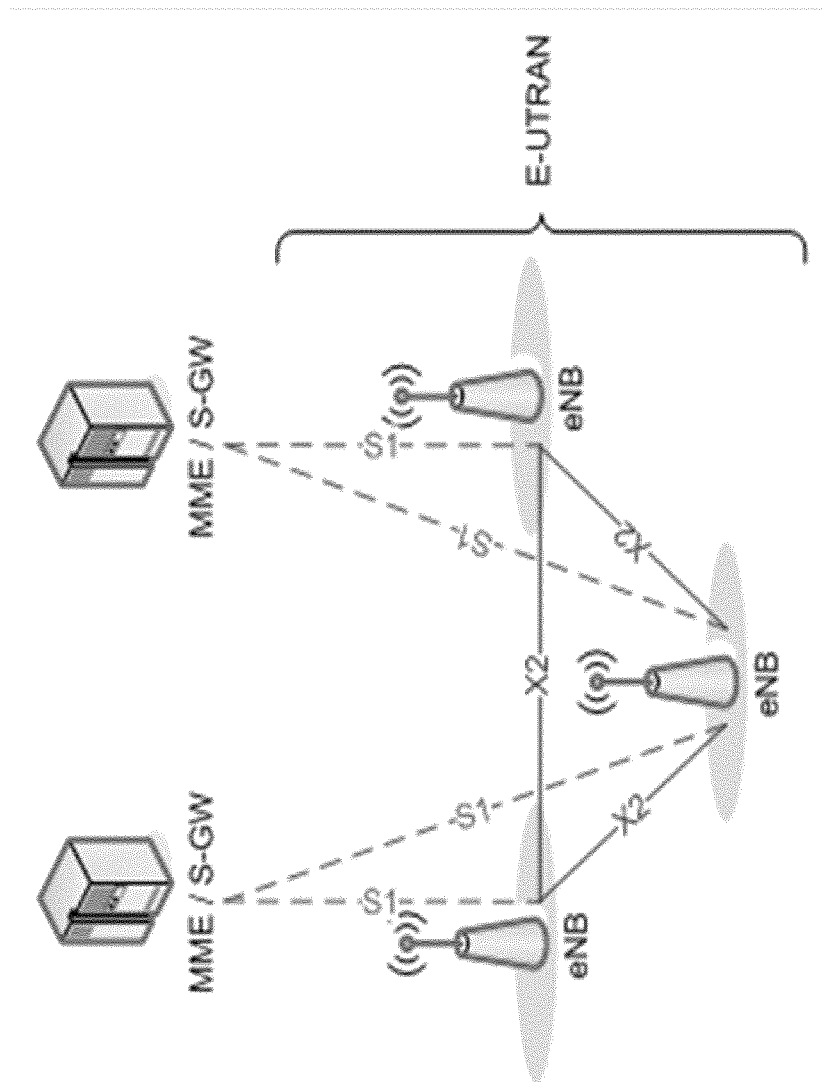
FIG. 2 is a schematic overview depicting a radio access network in connection with a core network.
Figure 3:
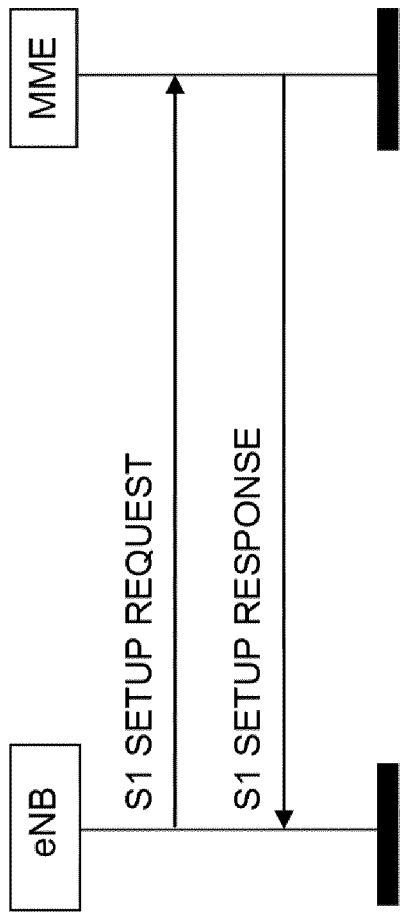
FIG. 3 is a signalling scheme according to prior art.
Figure 4:
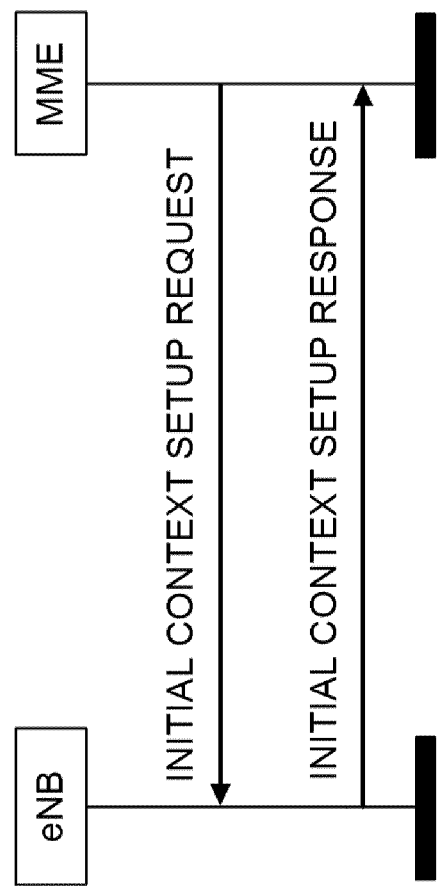
FIG. 4 is a signalling scheme according to prior art.
Figure 5:
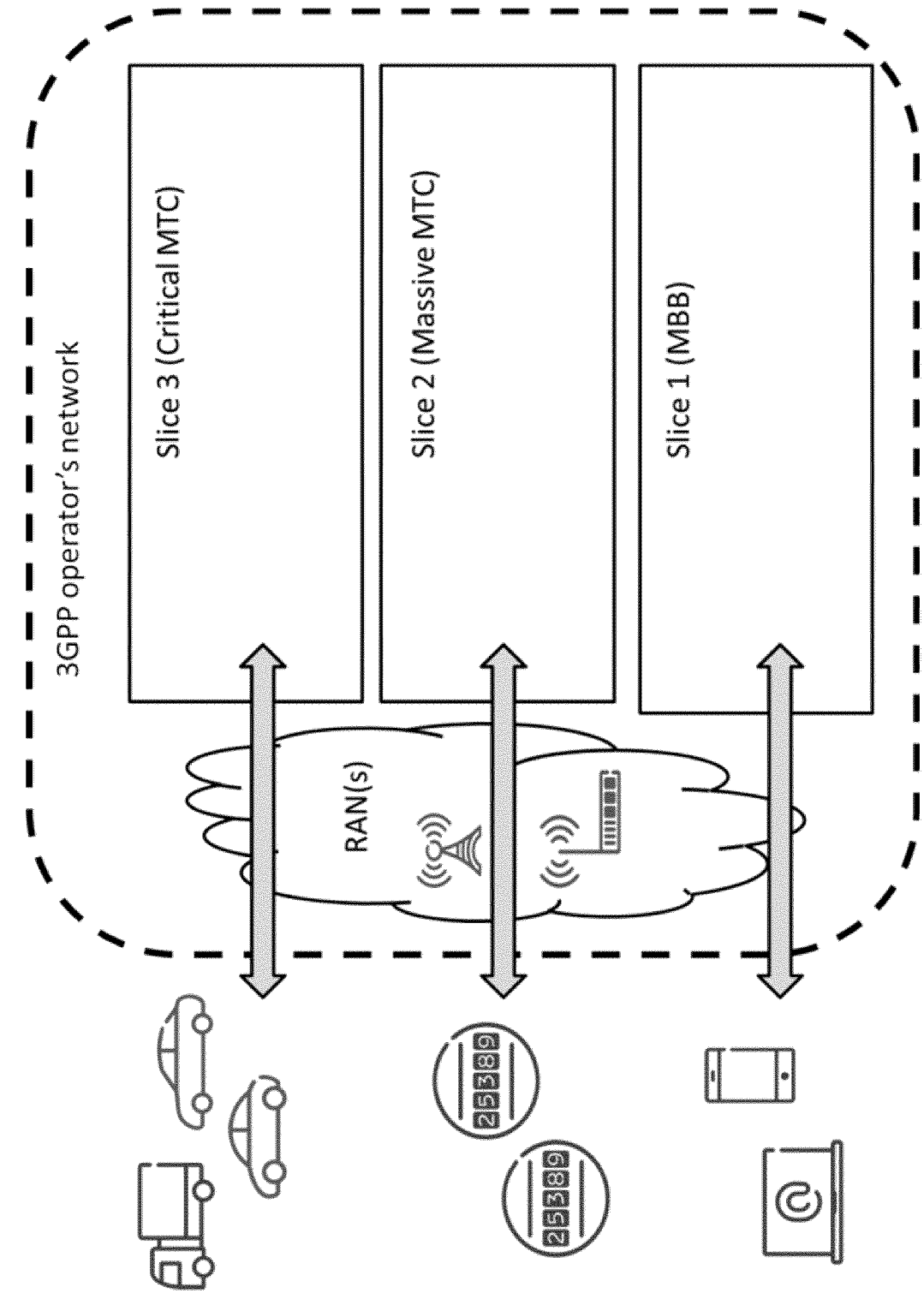
FIG. 5 is a schematic overview depicting an example of a slicing of a core network according to prior art.

As part of developing embodiments herein a problem has first been identified. A management system may comprise a domain manager (DM), also referred to as the operation and support system (OSS) node managing the radio network nodes. A DM may further be managed by a network manager (NM). The two radio network nodes may be interfaced by X2 and/or S1 interfaces, whereas the interface between two DMs is referred to as Itf-P2P. The management system may configure the radio network nodes, as well as receive observations associated to features in the radio network nodes. For example, DM observes and configures radio network nodes, while NM observes and configures DM, as well as the radio network nodes via DM. By means of configuration via the DM, NM and related interfaces, functions over the X2 and S1 interfaces can be carried out in a coordinated way throughout the RAN, eventually involving the Core Network, i.e. MME and S-GWs.

The LTE Rel-10 standard supports bandwidths larger than 20 MHz. One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier may be referred to as a Component Carrier (CC). In particular for early LTE Rel-10 deployments it can be expected that there will be a smaller number of LTE Rel-10-capable wireless devices compared to many LTE legacy wireless devices. Therefore, it is necessary to assure an efficient use of a wide carrier also for legacy wireless devices, i.e. that it is possible to implement carriers where legacy wireless devices can be scheduled in all parts of the wideband LTE Rel-10 carrier. The straightforward way to obtain this would be by means of Carrier Aggregation (CA). CA implies that an LTE Rel-10 terminal may receive multiple CC, where the CC have, or at least the possibility to have, the same structure as a Rel-8 carrier. A CA-capable wireless device is assigned a primary cell (PCell) which is always activated, and one or more secondary cells (SCells) which may be activated or deactivated dynamically.

The number of aggregated CC as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a terminal: A terminal may for example support more downlink CCs than uplink CCs, even though the cell is configured with the same number of uplink and downlink CCs.

In addition, a key feature of carrier aggregation is the ability to perform cross-carrier scheduling. This mechanism allows a Physical Downlink Control Channel (PDCCH) or an enhanced PDCCH (EPDCCH) on one CC to schedule data transmissions on another CC by means of a 3-bit Carrier Indicator Field (CIF) inserted at the beginning of (E)PDCCH messages. For data transmissions on a given CC, the wireless device expects to receive scheduling messages on the (E)PDCCH on just one CC—either the same CC, or a different CC via cross-carrier scheduling; this mapping from (E)PDCCH to Physical Downlink Shared Channel (PDSCH) is also configured semi-statically.'

In dual connectivity (DC) the wireless device may be served by the two radio network nodes called master eNB (MeNB) and secondary eNB (SeNB). The wireless device is configured with Primary CC from both MeNB and SeNB. The PCell from MeNB and SeNB are called PCell and PSCell (Primary SCell) respectively. The PCell and PSCell operate the wireless device typically independently. The wireless device is also configured with one or more Secondary CCs from each of MeNB and SeNB. The corresponding secondary serving cells served by MeNB and SeNB are called SCell. The wireless device in DC typically has separate TX/RX for each of the connections with MeNB and SeNB. This allows the MeNB and SeNB to independently configure the wireless device with one or more procedures e.g. radio link monitoring (RLM), Discontinuous Reception (DRX) cycle etc on their PCell and PSCell respectively.

Furthermore, 3GPP is currently working on a feature to enable Dual Connectivity based traffic aggregation between LTE and WLAN. This would enable the wireless device to send and receive a data stream over LTE and Wi-Fi simultaneously which will allow for high throughputs by both using LTE and using Wi-Fi while having LTE connection as an anchor connection where mobility is handled and hence a stable connection is ensured.

This type of aggregation will be performed by a split in the PDCP layer where in downlink a LTE radio base station is sending parts of the packets via an interface to a WLAN AP, which sends the packets to the wireless device's Wi-Fi-chipset and in the wireless device's Wi-Fi-chipset the packets are extracted and being merged in to the stream in PDCP again.

As stated above, network slicing consists of a method by which a wireless device is assigned one or more identifiers corresponding to distinct end-to-end virtual networks (slices), which are then realized by one or more physical resource pools and where specific policies per network slice are applied. Such resource pools may regard the core network (CN) or the radio access network (RAN) or both.

It is currently not possible to let radio network nodes involved in the process of resource aggregation in intra or inter RAT, such as WLAN APs for WiFi aggregation or SeNBs for dual connectivity, know what network slice(s) is assigned to a wireless device. For this reason these radio network nodes cannot serve the wireless device according to the QoS and resource policy assigned to that specific slice.

If radio network nodes participating in resource aggregation to serve a wireless device are not aware of the network slice assigned to such wireless device, there might be the risk that Service Level Agreements (SLAs) may not be respected. Such SLAs may specify the resources, the QoS, the performance requirements and more, with which the wireless device assigned to the specific slice ID shall be served. At the same time, if nodes participating in resource aggregation for serving a wireless device are not aware of the slice ID assigned to the wireless device's traffic, it might not be possible to establish the right connection to appropriate network nodes and to opportunely route wireless device's traffic to the radio network nodes that may apply resource management in accordance to the SLA for that specific slice.

For example, a specific network slice may be assigned to specific CN nodes or it might be subject to specific radio resource restrictions. By not knowing which network slice is used for a given wireless device served by means of resource aggregation techniques, it would not be possible to enforce the policies associated to the network slice.

In current work ongoing in 3GPP Release 13 as part of the DECOR work item, the CN signals to the eNB serving a wireless device a specific identifier, the MME Group ID (MMEGI). The eNB serving the wireless device would therefore enable connection of the wireless device to the MMEs associated to such MMEGI. The latter is a form of network slicing. Other ways of applying network slicing may be to configure a wireless device with an identifier pointing at a specific network slice and where the wireless device signals such identifier to the serving base station upon connection setup.

When a RAN is enabled to perform aggregation of different base stations resources, such as for the case of dual connectivity or WiFi aggregation, it would be important to inform all nodes involved in the aggregation process about the network slice identifier(s) used by the wireless device. This would allow for a correct handling of the UE context and corresponding services with respect to the resources agreed to be allocated to the slice in question.

Embodiments herein concerns how to make all nodes involved in the resource aggregation process aware of the network slices assigned to a specific wireless device.

Figure 6:
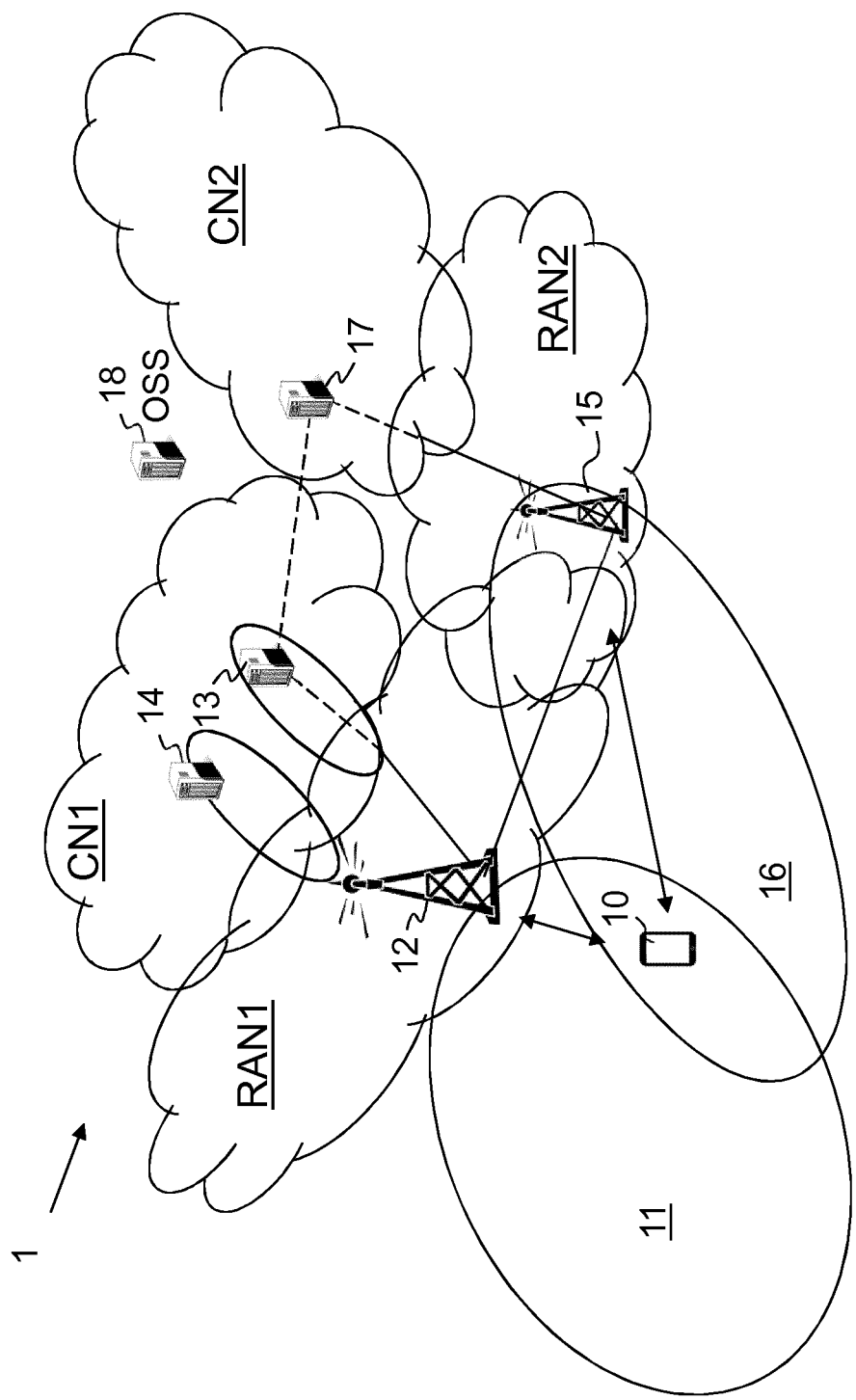
FIG. 6 is a schematic overview depicting a communication network according to embodiments herein.

Embodiments herein relate to communication networks in general. FIG. 6 is a schematic overview depicting a communication network 1. The communication network 1 comprises RANs and CNs. The communication network 1 may use a number of different technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. 3G and LTE.

In the communication network 1, wireless devices e.g. a wireless device 10 such as a mobile station, a non-access point (non-AP) STA, a STA, a user equipment and/or a wireless terminal, communicate via one or more Access Networks (AN), e.g. RAN, to one or more CNs. It should be understood by those skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a base station communicating within a cell.

The communication network 1 comprises a first radio network node 12 providing radio coverage over a geographical area, a first service area 11, of a first radio access technology (RAT), such as LTE, UMTS, Wi-Fi or similar. The first radio network node 12 may be a radio access network node such as radio network controller or an access point such as a wireless local area network (WLAN) access point or an Access Point Station (AP STA), an access controller, a base station, e.g. a radio base station such as a NodeB, an evolved Node B (eNB, eNodeB), a base transceiver station, Access Point Base Station, base station router, a transmission arrangement of a radio base station, a stand-alone access point or any other network unit capable of serving a wireless device within the service area served by the first radio network node 12 depending e.g. on the first radio access technology and terminology used. The first radio network node 12 is comprised in a first radio access network (RAN1) of a first network.

Furthermore, the first network or home network comprises a first core network (CN1) also denoted home core network of the wireless device 10. The first network is virtually network sliced into a number of network slices, the CN1 and/or the RAN1 may be virtually network sliced into CN slices and/or RAN slices, each network slice or core network slice supports one or more type of wireless devices and/or one or more type of services i.e. each network slice supports a different set of functionalities. Network slicing introduces the possibility that the network slices are used for different services and use cases and these services and use cases may introduce differences in the functionality supported in the different network slices. Each network slice may comprise one or more network nodes or elements of network nodes providing the services/functionalities for the respective network slice. Each slice may comprise a network node such as a RAN slice node or a core network slice node e.g. Radio Software Defined Networking (SDN) nodes, MMEs, S-GWs, Serving GPRS Support Nodes (SGSN), or corresponding nodes in e.g. a 5G network or similar. The GPRS meaning General Packet Radio Services. For example, a first network slice for e.g. MBB devices may comprise a first network slice node 13. A second network slice for e.g. MTC devices may comprise a second network slice node 14. Each network slice supports a set of functionalities out of a total set of functionalities in the communication network. E.g. the first network slice node 13 supports a first set of functionalities out of the total set of functionalities in the communication network 1. The first set of functionalities is separated from a different set of functionalities out of the total set of functionalities in the communication network 1. E.g. the first set of functionalities being associated with MTC devices is separated or logically separated, e.g. using separated data storage or processing resources, from a second set of functionalities of the second network slice being associated with MTC devices.

The first set of functionalities may use one or more resources in a core or RAN network of the communication network, which one or more resources are separated from other resources used by a different set of functionalities, i.e. different network slices, out of the total set of functionalities in the communication network 1. The resources may then be dedicated or virtually dedicated for each set of functionalities or network slice. Thus, the network slice node may be separated from other network slice nodes supporting a second set of functionalities out of the total set of functionalities in the communication network. Separated meaning herein physically separated wherein the network slice nodes may be executed on different hardware platforms and therefore using different resources of the hardware, and/or logically separated wherein the network slice nodes may be executed on a same hardware platform and use different resources such as memory parts or resources of processor capacity but may also use some same resources of the hardware e.g. a single physical network slice node may be partitioned into multiple virtual network slice nodes.

Hence, the first network slice node 13 supports the first set of functionalities out of the total set of functionalities in the first network of the communication network, which first set of functionalities belongs to the first network slice of the first network, and is separated from another set of functionalities out of the total set of functionalities in the first network.

Furthermore, the communication network 1 comprises a second network comprising a second core network (CN2), also denoted as visited core network, and a second RAN, RAN2. Also this second network may be network sliced e.g. as the first network or differently. The communication network 1 further comprises a second radio network node 15 providing radio coverage over a geographical area, a second service area 16, of a second radio access technology (RAT), such as LTE, UMTS, Wi-Fi or similar. The second radio network node 15 has its own radio resource management (RRM) for the second service area 16. The second radio network node 15 may be a radio access network node such as radio network controller or an access point such as a WLAN access point or an Access Point Station (AP STA), an access controller, a base station, e.g. a radio base station such as a NodeB, an evolved Node B (eNB, eNodeB), a base transceiver station, Access Point Base Station, base station router, a transmission arrangement of a radio base station, a stand-alone access point or any other network unit capable of serving a wireless device within the service area served by the second radio network node 15 depending e.g. on the second radio access technology and terminology used. The second radio network node 15 is comprised in the second radio access network, RAN2. The first and second RAT may be the same or different RATs.

The second network may comprise one or more core network nodes 17 e.g. Radio SDN nodes, MMEs, S-GWs, SGSNs, or corresponding nodes in e.g. a 5G network or similar, supporting a certain set of functionalities out of a total set of functionalities in the communication network, which may be the same or similar as ones supported by the first network slice.

Furthermore, the communication network 1 may comprise a central node 18, such as an Operations Support System (OSS) node for managing at least parts of the communication network 1.

The first radio network node 12 is connected to the second radio network node 15, over an X2 connection/s, S1 connection/s or a combination thereof or similar, and bearer traffic addressed to and from the wireless device 10 is delivered by the first and second radio network nodes. Namely, bearer traffic delivery to and from the wireless device 10 is performed by both radio network nodes while the wireless device 10 receives/transmits data over two different radio links, one per radio network node, for the same bearer traffic.

The first radio network node 12, to which the wireless device 10 is connected at a control plane level, either forwards user plane traffic, such as PDCP layer traffic, to a second radio network node 15 or causes user plane traffic to be provided directly to the second radio network node 15 from the core network. Like for dual connectivity in LTE, the first radio network node 12 may assume a role similar to a Master eNB (MeNB), while the second radio network node 15 may assume a role similar to a Secondary eNB (SeNB). In another example the first radio network node 12 may be an eNB and the second radio network node 15 may be a WLAN access point (AP). The wireless device 10 may thus be served by both the eNB and the WLAN AP.

Hence, according to embodiments herein wherein the wireless device 10 is jointly served by the first radio network node 12 and the second radio network node 15, the first radio network node 12 signals to the second radio network node 15 an indication, e.g. a slice ID(s), associated with the wireless device 10 that will be jointly served by the first and the second radio network node 15. The second radio network node 15 may use this slice ID(s) to apply a same preconfigured resource utilization strategy associated to the network slice assigned to the wireless device 10 or to its bearers. Namely, by means of the slice ID received, the second radio network node 15 may be able to select specific RAN and/or CN nodes for the exchange of wireless device's traffic or partition resources in a specific way or execute specific algorithms/functions.

Figure 7:
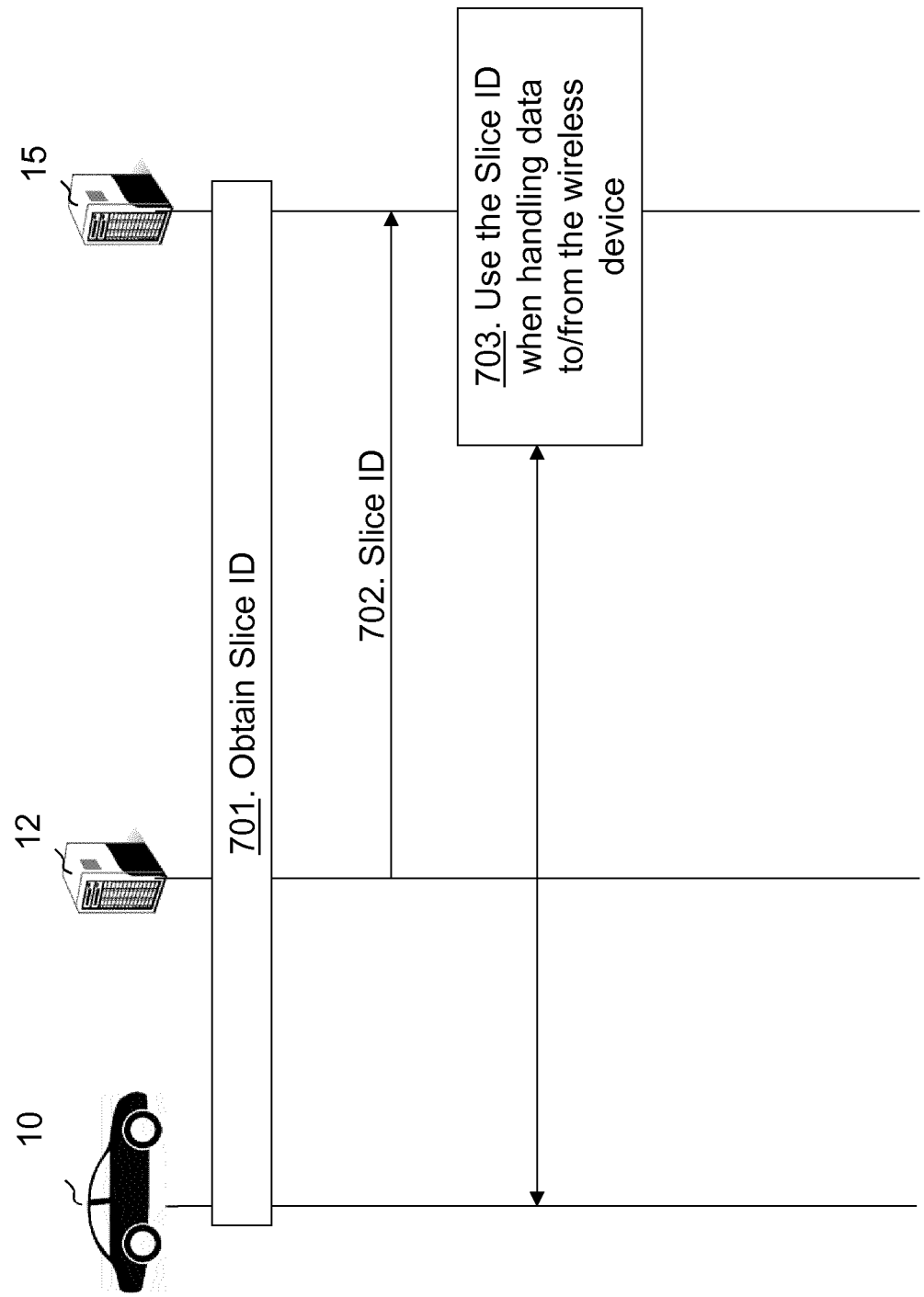
FIG. 7 is a combined flowchart and signalling scheme according to embodiments herein.

FIG. 7 is a combined flowchart and signalling scheme according to embodiments herein for enabling communication for the wireless device 10 when being or to be jointly served by the first and the second radio network nodes.

Action 701. The first network node 12 obtains the identity of the first network slice/s supporting the wireless device 10. E.g. the first radio network node 12 serving the wireless device 10 at control plane (CP) level is informed of the slice ID(s) assigned to the wireless device. The slice ID(s) may be used by this first radio network node 12 to enable preconfigured policies such as selection of specific CN nodes for communication related to the connected wireless device 10, e.g. both UP data traffic exchange and wireless device associated signalling, and partitioning of resources/resource utilization strategies for the delivery of traffic related to the wireless device 10. Such resources may consist of time-frequency resources over the radio interface, transport network resources over the interface between the first radio network node 12 and the CN, memory and processing resources for handling wireless device communication or the execution of specific algorithms/functions for the specific first network slice/s. The identity may be obtained from a central node, the wireless device 10 or be pre-configured. The slice ID may be signalled, e.g. by the wireless device 10, either in a single value valid for all bearers established for the wireless device 10 or in multiple values, one for each bearer established for the wireless device 10.

Action 702. The first radio network node 12 transmits the indication of the first network slice identity to the second radio network node 15. Thus, the first radio network node 12 may signal to the second radio network node 15 the slice ID(s) associated with the wireless device 10 that will be or is jointly served by the first and the second radio network node. Additionally or alternatively, the slice ID of the first network slice may be assigned to each bearer established for the wireless device 10. Different slice IDs may be assigned to different bearers established for the wireless device 10. A mapping of the slice ID per bearer may therefore be signaled by the first radio network node 12 to the second radio network node 15. The slice ID(s) associated to the wireless device 10 or associated to each bearer of the wireless device 10 may be signaled to the first radio network node 12 by a central node and then signaled by the first radio network node 12 to the second radio network node 15. Such slice ID may be in the form of an MMEGI.

Action 703. The second radio network node 15 may then use this identifier to apply the same pre-configured resource utilization strategies associated to the slice assigned to the wireless device 10 or to its bearers. E.g. by means of the slice ID received, the second radio network node 15 may be able to select specific CN nodes for the exchange of UE's traffic or partition resources in a specific way or execute specific algorithms/functions.

When the indication is indicating slice ID per bearer of the wireless device 10, the second radio network node 15 may establish different connections with specific CN nodes for each bearer. The second radio network node 15 may apply different resource utilization strategies for each bearer traffic of the wireless device 10, depending on the Slice ID associated to the bearer.

The first and/or second radio network node may use the slice ID(s) associated to the wireless device 10 or to the bearers of the wireless device 10 to generate counters, such as data volume counters. E.g. such counters may be collected on a per wireless device or per bearer and on a per Slice ID basis. The counters may be aggregated to represent per slice statistics, for example in the form of per slice data volumes. The counters may be reported to a central node such as the OAM system for the purpose of monitoring user's traffic or to create charging records that might be used to bill customers based on specific tariffs set per data volume unit and per slice ID.

The same method of inter-RAN-node communication is used for inter-RAN-node mobility, where the target RAN-node, the second radio network node 15, allocates resources to the wireless device 10 to be handed over based on the slice ID information received from the source-RAN-node, the first radio network node 12. This requires that the target-RAN-node is able to interpret the resource utilization strategies associated to a specific Slice ID in the same way as the source-RAN-node. Inter-RAN-node mobility ("handover") foresees to transfer UE context data from the source to the target-RAN-node. In this embodiment mobility of bearers assigned to a specific network slice would be dependent on whether the target RAN supports the slice ID assigned to such bearers in the source. If this is not the case such bearers may be allocated to a default slice, i.e. a default set of resources aimed at serving bearers whose slice is not supported. If in addition a new CN resource cluster would need to be selected, a CN resource cluster different from the one to which the source-RAN-node was connected, the selection would be based on the slice ID as well. In one example of this embodiment mobility procedures may be performed to change the primary serving node in the configuration where the wireless device 10 is served by two nodes at the same time. In a similar way procedures may be performed to change the secondary node serving the wireless device. In addition procedures may be performed to add a new secondary node that would serve the wireless device 10 together with other nodes already doing so. In each of these procedures the source node, namely the primary node serving the wireless device 10 before any change is applied to the configuration, signals to the newly added node, i.e. the mobility target or the new secondary node, the slice ID according to which the bearers should be served.

Embodiments described herein allow enabling specific resource management policies and network behaviors for cases where different radio network nodes are used to jointly serve the same wireless device and where network slicing is used. The embodiments contemplate the use of a piece of information that allows the identification of such resource management policy or in equivalent terms the identification of a network slice and its allocated share of resources within the network. The embodiments cover both the case of wireless devices served conjunctly by multiple radio network nodes of potentially different radio technologies as well as the case of wireless devices moving within a mobile network and needing the resource management policy to be delivered to a new serving RAN node. Therefore the embodiments allow for the adoption of the resource management policies assigned to the wireless device and its bearers to be enforced also after the wireless device moves across RAN nodes or RANs. Embodiments herein thus enable the communication for the wireless device across RAN nodes or RANs leading to an improved performance of the wireless communication network.

Figure 8:
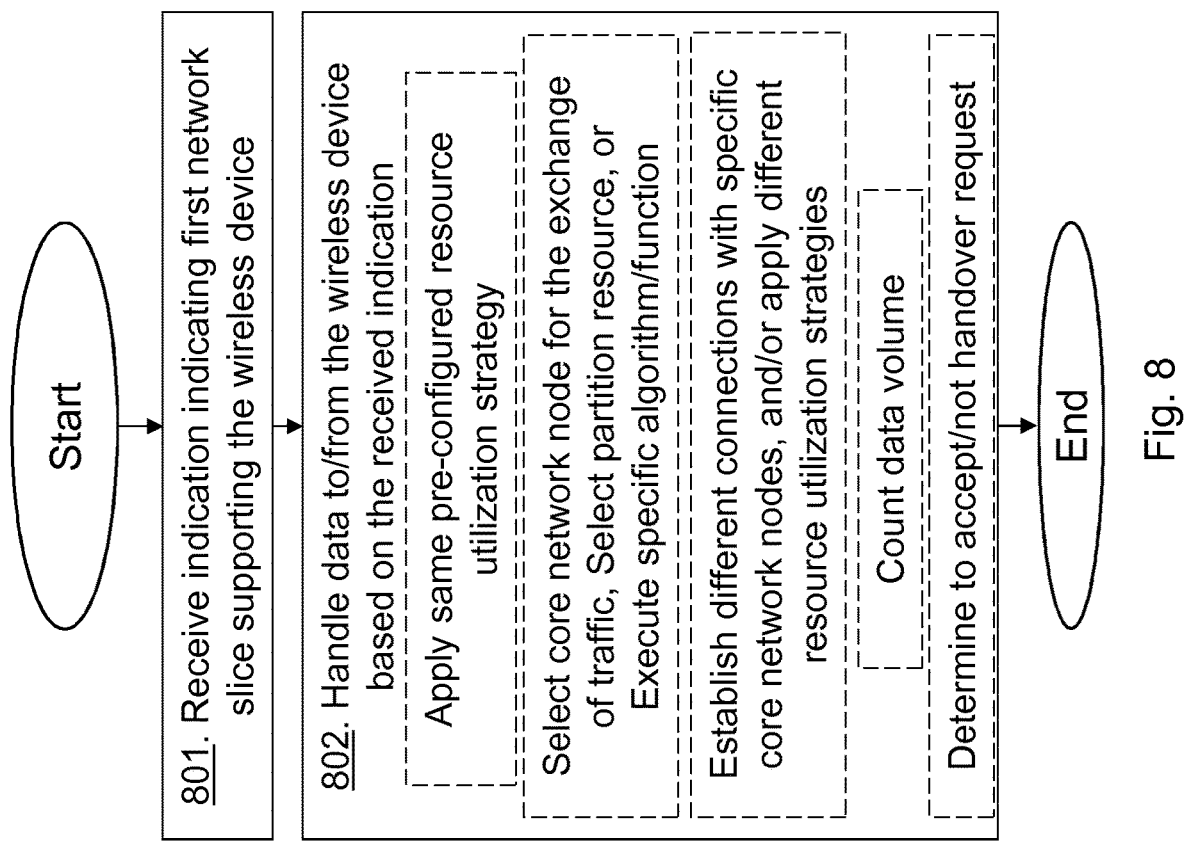
FIG. 8 is a schematic flowchart depicting a method performed by a second radio network node according to embodiments herein.

The method actions performed by the second radio network node 15 for enabling the communication for the wireless device 10 in the communication network according to some embodiments will now be described with reference to a flowchart depicted in FIG. 8. The communication network 1 comprises the first network and the second network. The second radio network node 15 is associated with the second network and the first radio network node 12 is associated with the first network. The first radio network node 12 and the second radio network node 15 are serving or are to serve the wireless device 10 jointly. The first network comprises partitioned sets of functionalities wherein the first set of functionalities belongs to the first network slice supporting the wireless device 10, and which first set of functionalities is separated from another set of functionalities out of the total set of functionalities in the first network. The actions do not have to be taken in the order stated below, but may be taken in any suitable order. Actions performed in some embodiments are marked with dashed boxes.

Action 801. The second radio network node 15 receives the indication from the first radio network node 12, which indication indicates identity of the first network slice supporting the wireless device 10. The indication may indicate a single value valid for all bearers established for the wireless device 10 or in multiple values, one for each bearer established for the wireless device 10.

Action 802. The second radio network node 15 handles data to and/or from the wireless device 10 using, or based on, the received indication. For example, the second radio network node 15 may apply a same pre-configured resource utilization strategy associated to the first network slice assigned to the wireless device 10 or to its bearers as in the first network. Furthermore, the second radio network node 15 may select a core network node for the exchange of traffic of the wireless device 10, select a partition resource for the wireless device 10, or execute a specific algorithm or function for handling data to and/or from the wireless device 10. Additionally or alternatively, the second radio network node 15 may, when the indication is indicating slice ID per bearer of the wireless device 10, establish different connections with specific core network nodes for each bearer, and/or apply different resource utilization strategies for each bearer traffic of the wireless device 10, depending on the Slice ID associated to each bearer. The second radio network node 15 may further count data volume for the wireless device on a per wireless device or per bearer and on a per Slice ID basis. This counted data volume may be sent to a core network node or the central node 18 as statistics of the wireless device and/or network slice. The second radio network node 15 may handle the data by determining to accept or not accept a handover request from the first radio network node 12 based on the received indication.

Figure 9:
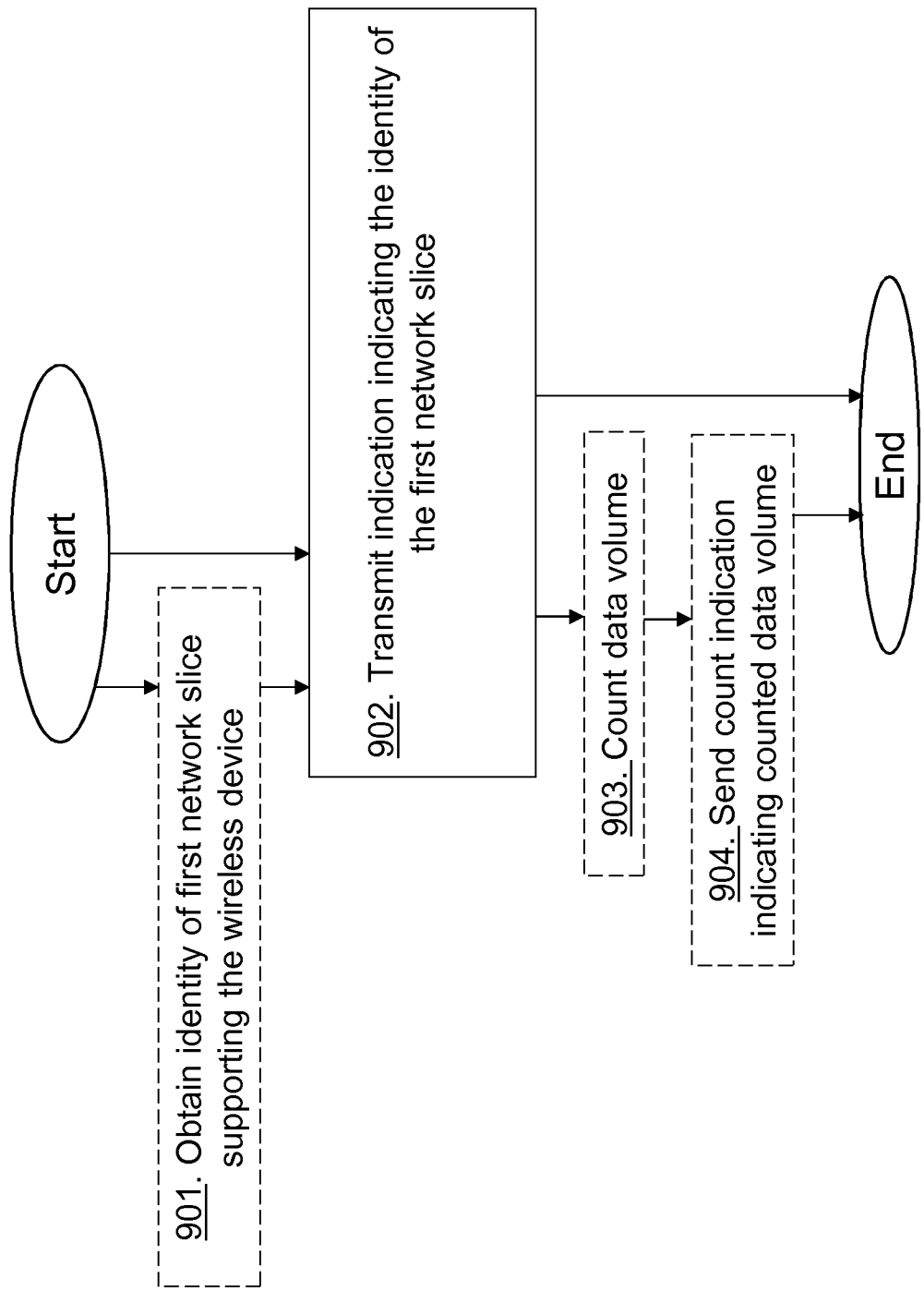
FIG. 9 is a schematic flowchart depicting a method performed by a first radio network node according to embodiments herein.

The method actions performed by the first radio network node 12 for enabling the communication for the wireless device 10 in the communication network 1 according to some embodiments will now be described with reference to a flowchart depicted in FIG. 9. The communication network 1 comprises the first network and the second network, which first radio network node 12 is associated with the first network and the second radio network node 15 is associated with the second network. The first radio network node 12 and the second radio network node 15 are serving or are to serve the wireless device 10 jointly. The first network comprises partitioned sets of functionalities wherein the first set of functionalities belongs to the first network slice supporting the wireless device 10. The first set of functionalities is separated from another set of functionalities out of the total set of functionalities in the first network. The actions do not have to be taken in the order stated below, but may be taken in any suitable order. Actions performed in some embodiments are marked with dashed boxes.

Action 901. The first radio network node 12 may obtain the identity of the first network slice supporting the wireless device 10. This may be obtained from the CN or the wireless device 10 and may be obtained by receiving the identity as a single value valid for all bearers established for the wireless device 10 or in multiple values, one for each bearer established for the wireless device 10.

Action 902. The first radio network node 12 transmits the indication to the second radio network node 15, which indication indicates identity of the first network slice supporting the wireless device 10. As stated above, the indication indicates the single value valid for all bearers established for the wireless device 10 or in the multiple values, one for each bearer established for the wireless device 10. Hence, the first radio network node 12 serving the wireless device 10 may signal the slice ID associated to the wireless device 10 or a multitude of slice IDs each assigned to a bearer of the wireless device 10 to the second radio network node 15 secondary serving the wireless device 10.

Action 903. In some embodiments, the first radio network node 12 may count data volume for the wireless device on a per wireless device or per bearer, and on a per Slice ID basis. In other words, the first radio network node 12 may collect statistics of the wireless device 10 per network slice for e.g. the central node 18.

Action 904. The first radio network node 12 may then send a count indication indicating the counted data volume to the central node 18.

Figure 10:
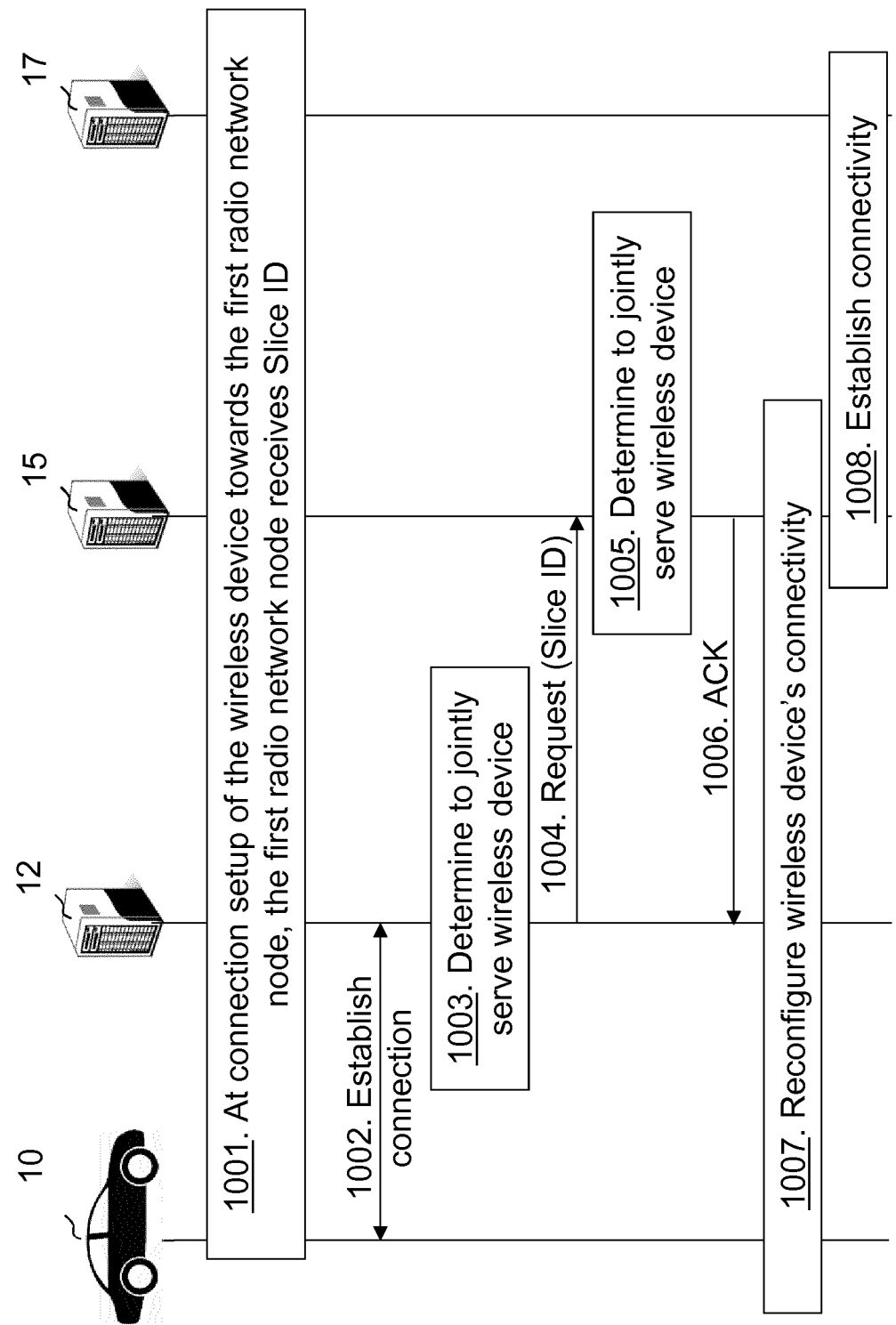
FIG. 10 is a combined flowchart and signalling scheme according to embodiments herein.

FIG. 10 is a combined flowchart and signalling scheme according to embodiments herein for enabling communication for the wireless device 10 when going to be jointly served by the first and the second radio network nodes. It should be noted that the first and second radio network nodes could be an LTE eNB or a WiFi Access Point, a combination of these two or nodes belonging to any other RAT technology.

Action 1001. Once the wireless device 10 initiates to establish a connection with the first radio network node 12, the serving first radio network node 12 may receive one or more slice ID associated to the wireless device by different means. At connection setup of the wireless device towards the first radio network node, the first radio network node receives Slice ID. For example, the slice ID may be received from a core network node, the central node 18 or it might be received from the UE, or both. The slice ID may be represented with an MMEGI or another identifier provided by the CN. The other example could be that of a slice ID provided by the wireless device as a single value or multiple values for different bearer, one value for each bearer.

Action 1002. The wireless device 10 establishes the connection to the first radio network node 12.

Action 1003. The first radio network node 12 determine to jointly serve the wireless device 10 with the second radio network node 15. E.g. in a case of dual connectivity, or where resources jointly provided by two radio network nodes where one is in charge of the connection to the wireless device 10 but not of the radio resources made available by the second node, the first radio network node 12 may decide if/when to set up the second 'leg'/set of resources based on fairly dynamic input, i.e. measurements from the wireless device 10 coupled with RRM strategies/policies, which may also be configured via the management system, but not the very dynamic time scales, rather for more static aspects, and capabilities of the wireless device 10, general load in the cell, etc.

Action 1004. The first radio network node 12 transmits a request e.g. an aggregation request, also referred to as a dual connectivity request, to the second radio network node 15. The request comprises the Slice ID(s) or at least indication of the slice ID(s), such as an index or the Slice ID. The request may request resources for the wireless device 10 from the second radio network node 15. Hence, the first radio network node 12 may request the second radio network node 15 to aggregate traffic, namely it may request that joint communication from the first and second radio network nodes with the wireless device 10 is established. Within such request the one or more slice ID assigned to the wireless device 10 is included.

Action 1005. The second radio network node 15 determines to serve the wireless device 10 jointly with the first radio network node 12, e.g. accept the request or not. This may be based on load, available resources, and/or capability to provide same or similar resources as the first network slice indicated by the received indication.

Action 1006. The second radio network node 15 acknowledges to jointly serve the wireless device 10. The ACK may thus mean that the wireless device 10 will be served in a jointly way with the first radio network node 12 as well as it acknowledges that the received slice ID(s) will be taken into account.

Action 1007. The wireless device's connectivity is reconfigured so that the wireless device 10 is served by the first and second radio network nodes jointly and in accordance to resource policy per slice ID.

Action 1008. The second radio network node 15 establishes connectivity of the second radio network node 15 to a core network node such as the core network node 17 or a different core network node supporting a same or similar network slice as the first network slice. The second radio network node 15 may then handle data to/from the wireless device 10 based on the received indication. The second radio network node 15 may use the slice ID(s) to enable specific radio resource utilization strategies which might provide a per-slice specific treatment of the wireless device 10 and/or its bearers. For example, such strategies may consist of prioritizing traffic for the wireless device 10 by shortening a delay each packet is subject to when being transmitted to the wireless device 10 or when being forwarded to the CN. Another specific strategy could be to increase the reliability of the traffic for the wireless device 10 which traffic is associated with the indicated slice ID, namely reducing the chance that errors would affect the communication with the wireless device 10. Yet another strategy would be to reserve a set of resources to the bearer traffic so that specific bit rate targets can be met.

Thus, SLAs may be respected, e.g., SLAs specifying the resources, the QoS, the performance requirements and more, with which the wireless device 10 assigned to the specific slice ID shall be served. In the case resource aggregation for serving the wireless device 10 is performed, the second radio network node 15 establishes the right connection to appropriate network nodes. Furthermore, embodiments herein route wireless device's traffic to the radio network nodes that may apply resource management in accordance to the SLA for that specific slice.

According to embodiments herein, the second radio network node 15 may be configured to exchange traffic with the wireless device 10 via a specific CN node, e.g. the core network node 17, namely traffic is delivered from and optionally forwarded to a CN node rather than being exchanged with the first radio network node 12. In this case the second radio network node 15 or the first radio network node 12 on its behalf may signal a message to the selected CN node, the CN node 17, in which one or more Slice ID associated to the wireless device 10 is indicated to the CN node. The CN node in question may therefore also enable specific policies for the particular wireless device 10. For example, the CN node 17 may decide to apply traffic prioritization, or traffic throttling, or traffic dropping depending on the specific RRM strategy associated to the wireless device.

It should be noted that in the example of dual connectivity a number of parameters are provided already from the MeNB, e.g. the first radio network node 12, to the SeNB, e.g. the second radio network node 15, in order to indicate an initial radio resource management policy. One of such parameters is an Average Maximum Bit Rate (AMBR) of the wireless device 10. However, these parameters may not always allow to determine a mapping with a specific radio resource management strategy specifically defined for the selected network slice.

In another method according to the embodiments herein, the first and second radio network nodes may use the slice ID(s) to collect specific measurements for the wireless devices associated to the slice ID(s).

For example, the first and second nodes may collect:
data volume reports per different QoS parameters and per uplink or downlink traffic direction on a per slice ID basis;
performance counters such as number of successful connection attempts to the RAN, number of failed connection attempts to the RAN, overall connection attempts to the RAN on a per slice ID basis or per slice ID and per wireless device;
number of active wireless devices or active bearers per slice ID;
packet discard and loss rate per slice ID or per slice ID per wireless device;
Average data throughput in UL and DL per slice ID and per slice ID per wireless device;
Average signaling load per slice ID and per slice ID per wireless device;
Average signaling throughput in UL and DL per slice ID and per slice ID per wireless device;
Key performance indicators on a per slice ID and per slice ID per wireless device basis;

The first and/or the second radio network nodes may report the collected measurements and statistics to a specific central node, e.g. an Operations, Administration, and Maintenance (OAM) system e.g. OSS node, which can be selected by means of the slice ID associated to the measurements.

In another embodiment, one or more identifiers related to resource utilization strategies ("Slice ID") is/are provided during inter-RAN-node connected mode mobility ("handover") from the source, e.g. the first radio network node 12, to the target-RAN-node, e.g. the second radio network node 15. The second radio network node 15 may decide to immediately establish a connection to the wireless device 10 via a third (target) radio network node, either during handover or afterwards. The first radio network node 12 may also provide Slice ID(s) applicable for second RAN nodes to the target side. In a similar case the slice ID may be signaled by the first radio network node 12, providing CP connectivity, serving the wireless device 10 to a new radio network node, e.g. the third radio network node, added to serve the wireless device 10 in parallel with the first radio network node 12. If in addition a new CN resource cluster would need to be selected, a CN resource cluster different from the one to which the source-RAN-node was connected, the selection would be based on the slice ID as well.

Hence, according to some embodiments herein the first radio network node 12 establishes a connection with the second radio network node 15 for the purpose of delivering radio bearer traffic to the wireless device 10 from both the first and second radio network nodes. The first radio network node 12 may then receive one or more slice IDs for the wireless device associated to the bearers to be served by the first and second radio network nodes. The first radio network node 12 signals the slice ID(s) to the second radio network node 15 either mapping it to the wireless device 10 or mapping it to each bearer active for the wireless device 10 and to be served by the second radio network node 15. The second radio network node 15 then uses the one or more slice IDs to identify appropriate CN nodes and to establish connections with the CN nodes for bearer traffic delivery. The second radio network node 15 may use the slice IDs to enable specific resource partitioning for the bearer traffic of the wireless device 10 depending on the policy assigned to each slice ID. Furthermore, the first radio network node 12 and the second radio network node 15 may generate statistics such as data volume counters per bearer traffic associated to a specific slice ID. Such statistics may be reported to the central node 18 and used for monitoring purposes or to generate charging records with which billing may be performed.

Figure 11:
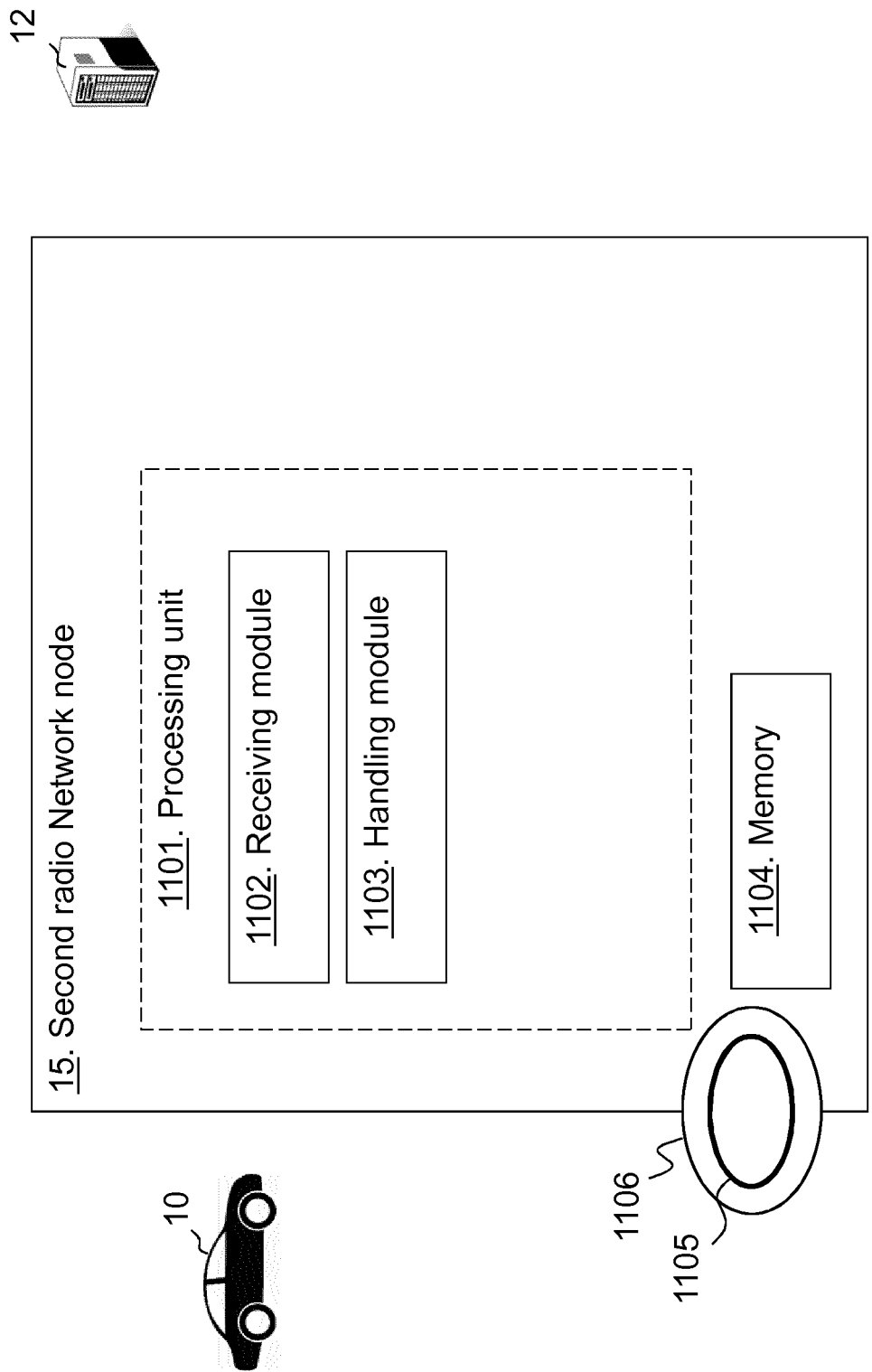
FIG. 11 is a block diagram depicting a second radio network node according to embodiments herein.

FIG. 11 is a block diagram depicting the second radio network node 15 according to embodiments herein for enabling communication for the wireless device 10 in the communication network 1. The communication network 1 comprises the first network and the second network, which second radio network node 15 is configured for the second network and the first radio network node 12 is configured for the first network. The first radio network node 12 and the second radio network node 15 are configured to serve the wireless device 10 jointly. The first network comprises partitioned sets of functionalities wherein the first set of functionalities belongs to the first network slice supporting the wireless device 10, and which first set of functionalities is separated from another set of functionalities out of the total set of functionalities in the first network. The second radio network node 15 may comprise a processing unit 1101, one or more processors, configured to perform the methods herein.

The second radio network node 15 is configured to receive the indication from the first radio network node 12, which indication indicates identity of the first network slice supporting the wireless device. The indication may indicate the single value valid for all bearers established for the wireless device 10 or in the multiple values, one for each bearer established for the wireless device 10. The second radio network node 15 may comprise a receiving module 1102. The processing unit 1101 and/or the receiving module 1102 may be configured to receive the indication from the first radio network node 12.

The second radio network node 15 is further configured to handle data to and/or from the wireless device 10 using the received indication. The second radio network node 15 may be configured to handle the data by being configured to apply a same pre-configured resource utilization strategy associated to the first network slice assigned to the wireless device 10 or to its bearers as in the first network. The second radio network node 15 may be configured to handle the data by being configured to select a core network node for the exchange of traffic of the wireless device 10, select one or more partition resources for the wireless device 10, or execute a specific algorithm or function for handling data to and/or from the wireless device 10. The second radio network node 15 may be configured to handle the data by being configured to, when the indication is indicating slice ID per bearer of the wireless device 10, establish different connections with specific core network nodes for each bearer, and/or apply different resource utilization strategies for each bearer traffic of the wireless device 10, depending on the Slice ID associated to each bearer. The second radio network node 15 may be configured to handle the data by being configured to count data volume for the wireless device on a per wireless device or per bearer and on a per Slice ID basis. The second radio network node 15 may comprise a handling module 1103. The processing unit 1101 and/or the handling module 1103 may be configured to handle data to and/or from the wireless device 10 using the received indication. The processing unit 1101 and/or the handling module 1103 may be configured to handle the data by being configured to apply a same pre-configured resource utilization strategy associated to the first network slice assigned to the wireless device 10 or to its bearers as in the first network. The processing unit 1101 and/or the handling module 1103 may be configured to handle the data by being configured to select a core network node for the exchange of traffic of the wireless device 10, select one or more partition resources for the wireless device 10, or execute a specific algorithm or function for handling data to and/or from the wireless device 10. The processing unit 1101 and/or the handling module 1103 may be configured to handle the data by being configured to, when the indication is indicating slice ID per bearer of the wireless device 10, establish different connections with specific core network nodes for each bearer, and/or apply different resource utilization strategies for each bearer traffic of the wireless device 10, depending on the Slice ID associated to each bearer. The processing unit 1101 and/or the handling module 1103 may be configured to handle the data by being configured to count data volume for the wireless device on a per wireless device or per bearer and on a per Slice ID basis.

The second radio network node 15 further comprises a memory 1104. The memory comprises one or more units to be used to store data on, such as sets of functionalities, match indications, identities of network slices, counted statistics, support indications, S1 interface mappings to network slices, applications to perform the methods disclosed herein when being executed, and similar.

The methods according to the embodiments described herein for the second radio network node 15 are respectively implemented by means of e.g. a computer program 1105 or a computer program product, comprising instructions, i.e., software code portions, which, when executed on at least one processor, cause the at least one processor to carry out the actions described herein, as performed by the second radio network node 15. The computer program 1105 may be stored on a computer-readable storage medium 1106, e.g. a disc or similar. The computer-readable storage medium 1106, having stored thereon the computer program, may comprise the instructions which, when executed on at least one processor, cause the at least one processor to carry out the actions described herein, as performed by the second radio network node 15. In some embodiments, the computer-readable storage medium may be a non-transitory computer-readable storage medium.

Figure 12:
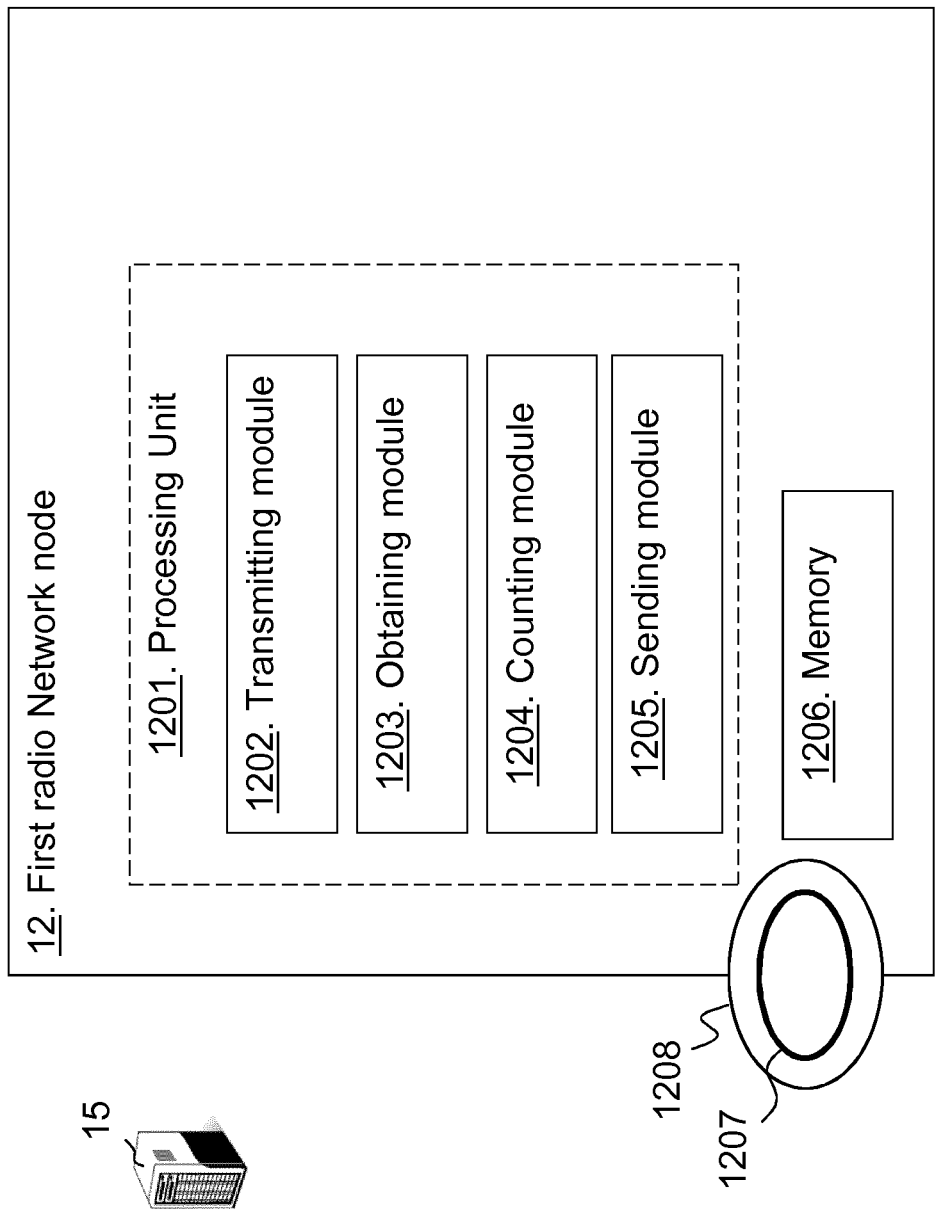
FIG. 12 is a block diagram depicting a first radio network node according to embodiments herein.

FIG. 12 is a block diagram depicting the first radio network node 12 according to embodiments herein for enabling communication for the wireless device 10 in the communication network 1. The communication network 1 comprises the first network and the second network, which first radio network node 12 is configured for the first network and the second radio network node 15 is configured for the second network. The first radio network node 12 and the second radio network node 15 are configured to serve the wireless device 10 jointly. The first network comprises partitioned sets of functionalities wherein the first set of functionalities belongs to the first network slice supporting the wireless device 10, and which first set of functionalities is separated from another set of functionalities out of the total set of functionalities in the first network. The first radio network node 12 may comprise a processing unit 1201, one or more processors, configured to perform the methods herein.

The first radio network node 12 is configured to transmit the indication to the second radio network node 15, which indication indicates identity of the first network slice supporting the wireless device 10. The indication may indicate the single value valid for all bearers established for the wireless device 10 or in the multiple values, one for each bearer established for the wireless device 10. The first radio network node 12 may comprise a transmitting module 1202. The processing unit 1201 and/or the transmitting module 1202 may be configured to transmit the indication to the second radio network node 15.

The first radio network node 12 may further be configured to obtain the identity of the first network slice supporting the wireless device 10. The first radio network node 12 may comprise an obtaining module 1203. The processing unit 1201 and/or the obtaining module 1203 may be configured to obtain the identity of the first network slice supporting the wireless device 10.

The first radio network node 12 may further be configured to count data volume for the wireless device on a per wireless device or per bearer, and on a per Slice ID basis. The first radio network node 12 may comprise a counting module 1204. The processing unit 1201 and/or the counting module 1204 may be configured to count data volume for the wireless device on a per wireless device or per bearer, and on a per Slice ID basis.

The first radio network node 12 may then further be configured to send the count indication indicating the counted data volume to the central node 18. The first radio network node 12 may comprise a sending module 1205. The processing unit 1201 and/or the sending module 1205 may be configured to send the count indication indicating the counted data volume to the central node 18.

The first radio network node 12 further comprises a memory 1206. The memory comprises one or more units to be used to store data on, such as sets of functionalities, match indications, identities of network slices, counted statistics, support indications, S1 interface mappings to network slices, applications to perform the methods disclosed herein when being executed, and similar.

The methods according to the embodiments described herein for the first radio network node 12 are respectively implemented by means of e.g. a computer program 1207 or a computer program product, comprising instructions, i.e., software code portions, which, when executed on at least one processor, cause the at least one processor to carry out the actions described herein, as performed by the first radio network node 12.

The computer program 1207 may be stored on a computer-readable storage medium 1208, e.g. a disc or similar. The computer-readable storage medium 1208, having stored thereon the computer program, may comprise the instructions which, when executed on at least one processor, cause the at least one processor to carry out the actions described herein, as performed by the first radio network node 12. In some embodiments, the computer-readable storage medium may be a non-transitory computer-readable storage medium.

Embodiments herein relate to a network with network slices i.e. core network with partitioned sets of functionalities where core network node 13 supports the first set of functionalities out of the total set of functionalities in the core network of the communication network. The first set of functionalities belongs to the first network slice of the core network, and is separated from another set of functionalities out of the total set of functionalities in the core network. Embodiments herein relate to Slice ID and network slicing, however, embodiments herein also apply to any technique that contemplates the possibility to associate specific strategies for resource or statistics handling to a wireless device or to part of the traffic in scenarios where the wireless device 10 is served simultaneously by different radio network nodes, e.g. scenarios of resource aggregation.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of radio network nodes will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method, performed by a second radio network node, for enabling communication for a wireless device in a communication network, the communication network comprising a first network and a second network, the second radio network node associated with the second network, wherein a first radio network node is associated with the first network, wherein the first radio network node and the second radio network node are serving or are to serve the wireless device jointly, and wherein the first network comprises partitioned sets of functionalities; the method comprising:
receiving an indication from the first radio network node, the indication indicating an identity of a first network slice supporting the wireless device, wherein a first set of functionalities belongs to the first network slice supporting the wireless device, and wherein the first set of functionalities is separated from another set of functionalities out of a total set of functionalities in the first network; and
handling data to and/or from the wireless device using the received indication, wherein the handling comprises counting data volume for the wireless device on a per slice identity (ID) basis.

2. The method of claim 1, wherein the handling further comprises applying a same pre-configured resource utilization strategy associated with the first network slice assigned to the wireless device, or to bearers of the wireless device, as in the first network.

3. The method of claim 1, wherein the handling further comprises:
selecting a core network node for an exchange of traffic of the wireless device; and
selecting a partition resource for the wireless device or executing a specific algorithm or function.

4. The method of claim 1, wherein the handling further comprises, when the indication is indicating slice ID per bearer of the wireless device, establishing different connections with specific core network nodes for each bearer, and/or applying different resource utilization strategies for each bearer traffic of the wireless device, depending on the slice ID associated with each bearer.

5. The method of claim 1, wherein the indication indicates:
a single value valid for all bearers established for the wireless device; or
multiple values, one for each bearer established for the wireless device.

6. The method of claim 1, wherein the handling further comprises counting the data volume for the wireless device on a per wireless device or per bearer basis.

7. The method of claim 1, wherein the handling further comprises determining to accept a handover request or not based on the received indication.

8. A method, performed by a first radio network node, for enabling communication for a wireless device in a communication network, the communication network comprising a first network and a second network, the first radio network node associated with the first network and a second radio network node associated with the second network, wherein the first network comprises partitioned sets of functionalities; the method comprising:
determining to jointly serve the wireless device with the second radio network node;
in response to the determining, transmitting a request to the second radio network node to jointly serve the wireless device, the request comprising an indication indicating an identity of a first network slice supporting the wireless device, wherein a first set of functionalities belongs to the first network slice supporting the wireless device, and wherein the first set of functionalities is separated from another set of functionalities out of a total set of functionalities in the first network; and
counting data volume for the wireless device on a per slice identity (ID) basis.

9. The method of claim 8, wherein the indication indicates:
a single value valid for all bearers established for the wireless device; or
multiple values, one for each bearer established for the wireless device.

10. The method of claim 8, further comprising obtaining the identity of the first network slice supporting the wireless device.

11. The method of claim 8, further comprising:
counting the data volume for the wireless device on a per wireless device or per bearer basis; and
sending a count indication indicating the counted data volume to a central node.

12. A second radio network node for enabling communication for a wireless device in a communication network, the communication network comprising a first network and a second network, the second radio network node configured for the second network, wherein a first radio network node is configured for the first network, wherein the first radio network node and the second radio network node are configured to serve the wireless device jointly, and wherein the first network comprises partitioned sets of functionalities; the second radio network node comprising:
processing circuitry; and
memory containing instructions executable by the processing circuitry whereby the second radio network node is operative to:
receive an indication from the first radio network node, the indication indicating an identity of a first network slice supporting the wireless device, wherein a first set of functionalities belongs to the first network slice supporting the wireless device, and wherein the first set of functionalities is separated from another set of functionalities out of a total set of functionalities in the first network; and
handle data to and/or from the wireless device using the received indication, wherein to handle the data, the second radio network node is operative to count data volume for the wireless device on a per slice identity (ID) basis.

13. The second radio network node of claim 12, wherein the instructions are such that the second radio network node is further operative to handle the data by applying a same pre-configured resource utilization strategy associated with the first network slice assigned to the wireless device or to bearers of the wireless device, as in the first network.

14. The second radio network node of claim 12, wherein the instructions are such that the second radio network node is further operative to handle the data by:
selecting a core network node for an exchange of traffic of the wireless device; and
selecting a partition resource for the wireless device or executing a specific algorithm or function.

15. The second radio network node of claim 12, wherein the instructions are such that the second radio network node is further operative to handle the data by, when the indication is indicating slice ID per bearer of the wireless device, establishing different connections with specific core network nodes for each bearer, and/or applying different resource utilization strategies for each bearer traffic of the wireless device, depending on the slice ID associated to each bearer.

16. The second radio network node of claim 12, wherein the indication indicates:
a single value valid for all bearers established for the wireless device; or
multiple values, one for each bearer established for the wireless device.

17. The second radio network node of claim 12, wherein the instructions are such that the second radio network node is further operative to handle the data by counting the data volume for the wireless device on a per wireless device or per bearer basis.

18. A first radio network node for enabling communication for a wireless device in a communication network, the communication network comprising a first network and a second network, the first radio network node configured for the first network, wherein a second radio network node is configured for the second network, and wherein the first network comprises partitioned sets of functionalities; the first radio network node comprising:
- processing circuitry; and
- memory containing instructions executable by the processing circuitry whereby the first radio network node is operative to:
  - determine to jointly serve the wireless device with the second radio network node;
  - in response to the determination, transmit a request to the second radio network node to jointly serve the wireless device, the request comprising an indication indicating an identity of a first network slice supporting the wireless device, wherein a first set of functionalities belongs to the first network slice supporting the wireless device, and wherein the first set of functionalities is separated from another set of functionalities out of a total set of functionalities in the first network; and
  - count data volume for the wireless device on a per slice identity (ID) basis.

19. The first radio network node of claim 18, wherein the instructions are such that the first radio network node is further operative to obtain the identity of the first network slice supporting the wireless device.

20. The first radio network node of claim 18, wherein the instructions are such that the first radio network node is further operative to:
- count the data volume for the wireless device on a per wireless device or per bearer basis; and
- send a count indication indicating the counted data volume to a central node.

* * * * *